United States Patent

[11] 3,619,451

[72] Inventor John Ernest Gill
             Saltcoats, Scotland
[21] Appl. No. 761,002
[22] Filed Sept. 19, 1968
[45] Patented Nov. 9, 1971
[73] Assignee Imperial Chemical Industries Limited
             London, England
[32] Priorities Sept. 28, 1967
[33]           Great Britain
[31]           44,477/67;
               Dec. 18, 1967, Great Britain, No.
               57,369/67

[54] POWDERED CELLULOSE ETHER
     13 Claims, No Drawings
[52] U.S. Cl. .................................. 264/109 R,
         260/231 R, 260/231 A, 260/232 R, 264/140 R
[51] Int. Cl. ........................................ B29j 5/00
[50] Field of Search ............................. 260/231 A,
                        232; 264/175, 286, 109, 140

[56] References Cited
UNITED STATES PATENTS

| | | | |
|---|---|---|---|
| 2,720,464 | 10/1955 | Anderson et al. | 106/197 |
| 2,833,758 | 5/1958 | Kohler et al. | 260/232 |
| 2,879,268 | 3/1959 | Jullander | 260/232 |
| 3,072,635 | 1/1963 | Menkart et al. | 260/232 |
| 3,251,824 | 5/1966 | Battista | 260/230 |
| 3,347,847 | 10/1967 | Engelskirchen et al. | 260/232 |
| 3,453,261 | 7/1969 | Scherff | 260/231 |

FOREIGN PATENTS

| | | | |
|---|---|---|---|
| 686,116 | 1/1953 | Great Britain | 260/232 |
| 1,080,249 | 8/1967 | Great Britain | 260/232 |

*Primary Examiner*—Donald E. Czaja
*Assistant Examiner*—M. I. Marquis
*Attorney*—Cushman, Darby & Cushman ABSTRACT: There is provided a method of preparing free-flowing cellulose ether comprising in press rolls a dried particulate partially gelled cellulose ether at a pressure in excess of 3 tons total load per linear foot of roll at a feed rate such as to give flakes with a thickness of 0.003–0.015 inches.

POWDERED CELLULOSE ETHER

This invention relates to an improved method of preparing free-flowing cellulose ether and to cellulose ether produced thereby.

Cellulose ether, as prepared from fibrous cellulose by the usual methods of treatment with an etherifying agent in presence of alkali, retains the fibrous form and is therefore difficult to handle or mix with other materials. It is advantageous for many applications to convert the cellulose ether to a substantially nonfibrous free-flowing form such as flakes or powder. Hitherto the conversion to powdered form has been effected by complete or partial gelation of the cellulose ether with a solvent and breaking down the gelled material either before or after drying off the solvent. Such methods are not altogether satisfactory. Fully gelled material requires considerable drying and the product is hard and requires considerable expenditure of energy in milling to break it down. Even partially gelled material produces horny agglomerates which are difficult to pulverize to a powder, and the product contains some fibrous material which tends to ball up in handling.

It is an object of this invention to provide an improved method of converting fibrous cellulose ether to substantially nonfibrous free-flowing flake, granular or powdered form.

It is a further object of the invention to provide an improved method of converting to substantially nonfibrous free-flowing form a cellulose ether which has been treated with aldehyde to increase the rate of dispersion and facilitate solution.

In accordance with the invention a free-flowing cellulose ether is prepared by a method comprising pressing in press rolls a dried particulate partially gelled cellulose ether at a pressure in excess of 3 tons total load per linear foot of roll at a feed rate such as to give flakes with a thickness of 0.003–0.015 inch. Preferably the feed rate is adjusted to give a flaked material having a thickness of 0.004–0.006 inches. Further preferably, the flaked material is subsequently pulverized. The flaked material is free-flowing, nonfibrous and is much more easily pulverized to a free-running powder than the original gelled material. In a preferred form of the invention the cellulose ether is first partially gelled by treatment with a solvent, the degree of gelation preferably being such as to fuse together the particles of the cellulose ether. For example, it is preferred to treat a water-soluble cellulose ether with water using sufficient to gel the surfaces of the particles and fuse them together. The gelled material is then granulated and dried.

Further according to the present invention the cellulose ether may be treated with an aldehyde prior to pressing in the press rolls. The aldehyde treatment may be given to the cellulose ether at different stages of its manufacture but one particularly suitable method is to treat the cellulose ether with an aldehyde solution during the partial gelation step. An ether which is soluble in cold water but insoluble in hot water is allowed to cool while in the water-wet condition giving partial gelation and the partially gelled product is sprayed with an aqueous aldehyde.

A further method of gelation and aldehyde treatment, applicable to ethers which are soluble in or gelled by water but insoluble in water-miscible organic solvent as, for example, ethyl alcohol, comprises purifying the ether by water-miscible organic solvent washing and diluting the solvent, thereby wetting the cellulose ether with water to allow partial gelation to occur and then spraying the ether with aqueous aldehyde.

The cellulose ether may also be treated with aldehyde after partial gelation, granulating and drying of the ether.

The aldehyde treatment may be carried out under varying neutral or acid conditions, depending on the ether employed and the degree of dispersibility required. The aldehyde used to treat the ether conveniently comprises glyoxal.

Whilst the invention may be used in the preparation of any flaked, granular or powdered cellulose ether, it is especially advantageous for water-soluble cellulose ethers including, for example, sodium carboxymethyl cellulose and alkyl celluloses such as methyl cellulose, ethyl methyl cellulose, hydroxyethyl methyl cellulose, ethyl hydroxyethyl cellulose and hydroxypropyl methyl cellulose.

The process of the invention requires less energy than processes hitherto used to produce powered cellulose ether.

The invention is further illustrated by the following examples in which all parts and percentages are by weight.

EXAMPLE 1

A hydroxypropyl methyl cellulose having 6.5 percent hydroxypropoxyl content and 21 percent methoxyl content and such that a 2 percent solution in water at 20° C. had a viscosity of 6000 cps. was isolated from the salts produced in its preparation reaction by washing with hot water. The water was drained from the ether and the water-wet ether containing 25 percent solids was cooled. During cooling the ether particles gelled sufficiently to fuse them together without destroying the fibrous nature of the particles. The partially gelled ether was granulated in a mill and the grains were dried to a moisture content of 3–5 percent. The dried grains, average size 0.024 inches, were hard and horny and could not be easily pulverized.

The dried grains were fed at a rate of 56 lb./hour from a hopper on to the surface of one of a pair of chilled-steel rolls 15 inches diameter and 30 inches long which were urged into contact by hydraulic pressure means. One roll only was directly driven at 50 r.p.m., the other being rotated by friction. The hydraulic pressure on the rolls was adjusted to maintain the pressure between the rolls in the range 1–16 tons total load. The pressed ether was scraped from the rolls as flakes having an average thickness of 0.004 inches. The flakes were fed to a pulverizing (Unipulver-Registered Trade Mark) mill and a finely divided, nonagglomerating, free-flowing powder passing 120 B.S.S. sieve and having a bulk density of 0.5 g./cc. was obtained. The feed rate was in excess of 240 lb./hour and the 60 amperage required was 60 amps. By comparison, the energy requirement for pulverizing grains of the partially gelled ether which had not been pressed by rolling was 100 amps at a feed rate of 112 lb./hour and the powder density was only 0.43 g./cc.

EXAMPLE 2

Ethyl methyl cellulose (methoxyl content as $OCH_3$ 4.4 percent and ethoxyl content 16.2 percent as $OC_2H_5$, both on a dry basis and such that a 2.5 percent solution in water had a viscosity of 30 cps. at 20° C.) was partially gelled by allowing the water-wet ether to cool and the partially gelled material was granulated, dried and pressed in rolls as described in example 1. The flakes produced had an average thickness of 0.006 inches. When the flakes were milled in a Unipulver mill at a rate of 240 lb./hour a finely divided, free-flowing, nonagglomerating powder was produced.

EXAMPLE 3

Dried grains of partially gelled hydroxypropyl methyl cellulose as used in example 1 were fed to the surface of one of a pair of chilled-steel rolls 14 inches diameter and 14 inches wide rotating with a differential speed ratio of 1.1 to 1, the speed of the slower roll being 50 r.p.m. The feed rate was maintained at 20 lb./hour and roll pressurizing means were adjusted to maintain the pressure between the rolls at 5 tons total load. The ether was converted to discrete, free-flowing flakes having an average thickness of 0.004 inches. The flakes were milled in a Unipulver mill at a feed rate of 200 lb./hour and a finely divided, nonagglomerating, free-flowing powder was obtained.

EXAMPLE 4

Methyl cellulose of methoxyl content 29 percent and such that a 2 percent aqueous solution at 20° C. had a viscosity of 4,000 cps. was partly gelled with water, granulated and dried as described in example 1. The dried grains were fed at 5 lb./hour through steel rolls 6 inches diameter and 8 inches long, rotating at 30 r.p.m. and kept together with a heavy screw press giving a total load of 3 tons to produce flakes of average thickness 0.005 inches. The flaked material was milled in a pulverizing mill (Raymond mill) to give a finely divided, nonagglomerating free-flowing powder.

EXAMPLE 5

Ethyl hydroxyethyl cellulose having a degree of substitution of 26 percent ethoxyl and 11.7 percent hydroxyethoxyl on a dry basis and such that a 2 percent solution in water had a viscosity of 600 cps. at 20° C. was partly gelled with water, granulated and dried as described in example 1. The grains were fed to steel rolls as used in example 4 at a feed rate of 4 lb./hour and a friable, free-flowing flaked material having an average flake thickness of 0.005 inches was obtained. The roll pressure was 3 tons total load. The flaked material was milled in a Raymond mill to give a finely divided, nonagglomerating, free-flowing powder.

EXAMPLE 6

100 parts of hydroxypropyl methyl cellulose of 6.5 percent hydroxypropoxyl content and 21 percent methoxyl content (dry basis) and such that a 2 percent solution in water at 20° C. had a viscosity of 6,000 cps., was purified by washing with hot water. Water was expressed from the ether until it contained 25 percent solids. 1 part of glyoxal as a 10 percent aqueous solution was sprayed on to the water-wet ether and the ether was allowed to cool. During the cooling the ether particles gelled sufficiently to fuse them together without destroying their fibrous nature. The partially gelled ether was granulated in a mill and the grains were dried to a moisture content of 3 to 5 percent. The dried grains had an average size of 0.024 inches and were hard and horny and could not be easily pulverized. The dried grains were fed to the surface of one of a pair of chilled, steel rolls, 14 inches diameter and 14 inches wide, rotating with a differential speed ratio of 1.1 to 1, the speed of the slower roll being 50 r.p.m. The feed rate was maintained at 20 lb./hour. The rolls were urged together by hydraulic pressure means, the pressure between the rolls being maintained at 5 tons total load. The ether was converted to discrete, free-flowing flakes having an average thickness of 0.004 inches. The flakes were milled in a Unipulver (Registered Trade Mark) pulverizing mill at a feed rate of 200 lb./hour and a finely divided, free-flowing powder was obtained. This powder dispersed readily when immersed in cold water and dissolved without formation of agglomerates.

EXAMPLE 7

Ethyl methyl cellulose of 4.4 percent methoxyl content and 16.2 percent ethoxyl content (dry basis) and such that a 2.5 percent solution in water had a viscosity of 30 cps. at 20° C., was purified from salts by hot water washing and the water was removed by a centrifuge to a moisture content of 40 percent. The water-wet material was transferred to a moving conveyor and allowed to cool until partial gelation occurred. It was then sprayed with 1.5 parts glyoxal per 100 parts of cellulose ether (as dry), the glyoxal being applied as 10 percent aqueous solution. The partially gelled material was granulated, dried and pressed in rolls as described in example 1 to give flakes having an average thickness of 0.006 inches. When the flakes were milled in a Unipulver mill at a rate of 240 lb./hour, a finely divided, free-flowing powder was produced. The powder dispersed readily when immersed in cold water and dissolved without formation of agglomerates.

EXAMPLE 8

Sodium carboxymethyl cellulose, having a degree of substitution of 0.7 and such that a 1 percent solution in water at 25° C. had a viscosity of 55 cps., was prepared by etherifying soda cellulose with monochloracetic acid and neutralizing with nitric acid and was purified from salts by washing with industrial methylated spirit of specific gravity 0.875 at 15° C. The volatile content of the cellulose ether was reduced in a centrifuge to 45 percent. The ether was transferred to a moving conveyor and sprayed with aqueous glyoxal solution at a rate of 1.10 parts of glyoxal in 30 parts of water to every 100 parts of aqueous spirit-wet cellulose ether. The cellulose ether partially gelled and was granulated in a mill, dried and pressed in rolls as described in example 1 to give discrete, free-flowing flakes having an average thickness of 0.004 inches. The flakes were milled in a Unipulver mill at a feed rate of 200 lb./hour and a finely divided, free-flowing powder was obtained. This powder dispersed readily when immersed in cold water and dissolved without formation of agglomerates.

EXAMPLE 9

100 parts of hydroxypropyl methyl cellulose such that a 2 percent solution in water at 20° C. had a viscosity of 2,000 cps. was prepared in a granular form as shown in example 1. The dried grains, average size 0.024 inches, were treated while being agitated by spraying with an aqueous acetone solution made up by mixing 1.5 parts of 30 percent glyoxal (equivalent to 0.5 percent on the dried cellulose ether) with 100 parts of acetone and the thus treated grains were dried at 80° C.

The dried grains were fed at a rate of 56 lb./hour from a hopper on to the surface of one of a pair of chilled-steel rolls 15 inches diameter and 30 inches long which were urged into contact by hydraulic pressure means. One roll only was directly driven at 50 r.p.m., the other being rotated by friction. The hydraulic pressure on the rolls was adjusted to maintain the pressure between the rolls in the range 8–16 tons total load. The pressed ether was scraped from the rolls as flakes having an average thickness of 0.004 inches. The flakes were fed to a pulverizing (Unipulver-Registered Trade Mark) mill and a finely divided, nonagglomerating, free-flowing powder passing 120 B.S.S. sieve and having a bulk density of 0.5 g./cc. was obtained.

A further sample of hydroxypropyl methyl cellulose was treated in the same manner but with the sole difference that 3.0 parts of 30 percent (equivalent to 1 percent on the dried cellulose ether) glyoxal with 100 parts of acetone were sprayed on to the 100 parts of treated grains. Thereafter the procedure was the same as described above.

The powder, made from granules which had been treated with 1 percent glyoxal, wetted and dispersed readily on addition to cold water without any agglomeration. The powder made from granules which had been treated with 0.5 percent of the weight of glyoxal dispersed more slowly without agglomeration. In contrast, powder prepared by a similar process but without any glyoxal treatment did not disperse but formed difficulty soluble gelled lumps.

What we claim is:

1. In a method of preparing a free-flowing cellulose ether by causing at least partial gellation of the cellulose ether with a solvent, drying the at least partially gelled cellulose ether and mechanically breaking down the cellulose ether, the improvement comprising forming the at least partially gelled cellulose ether into dried particles and pressing the dried particles in press rolls at a pressure in excess of 3 tons load per linear foot of roll and at a feed rate such as to produce flakes of dried cellulose ether with a thickness of 0.003–0.015 inches, which flakes are more easily pulverizable to a free-running powder.

2. A method as claimed in claim 1 wherein the feed rate is adjusted to give a flaked material having a thickness of 0.004–0.006 inches.

3. A method as claimed in claim 1 wherein the flaked material is subsequently pulverized.

4. A method as claimed in claim 1 wherein the cellulose ether is first partially gelled by treatment with a solvent, the degree of gelation being such as to fuse together the particles of cellulose ether.

5. A method as claimed in claim 4 wherein a water-soluble cellulose ether is treated with water in sufficient quantity to gel the surfaces of the particles and fuse them together.

6. A method as claimed in claim 4 wherein the cellulose ether is granulated and dried after partial gelation.

7. A method as claimed in claim 1 wherein the cellulose ether is treated with an aldehyde prior to pressing in the press rolls.

8. A method as claimed in claim 7 wherein the cellulose ether is treated with an aldehyde during the partial gelation step.

9. A method as claimed in claim 7 wherein a cellulose ether which is soluble in cold water but insoluble in hot water is allowed to cool while in the water-wet condition, giving partial gelation and the partially gelled product is sprayed with aqueous aldehyde.

10. A method as claimed in claim 7 comprising purifying a cellulose ether, which is soluble in or gelled by water but insoluble in water-miscible organic solvent, by water-miscible organic solvent washing and diluting the solvent, thereby wetting the cellulose ether with water to allow partial gelation to occur, and then spraying the ether with aqueous aldehyde.

11. A method as claimed in claim 7 wherein the cellulose ether is aldehyde treated after partial gelation, granulating and drying of the ether.

12. A method as claimed in claim 7 wherein the aldehyde used to treat the ether is glyoxal.

13. A method as claimed in claim 1 wherein the cellulose ether is selected from the group consisting of sodium carboxymethyl cellulose, methyl cellulose, ethyl methyl cellulose, hydroxyethyl methyl cellulose, ethyl hydroxyethyl cellulose and hydroxypropyl methyl cellulose.

* * * * *